United States Patent [19]

Joshi

[11] Patent Number: 5,186,244

[45] Date of Patent: Feb. 16, 1993

[54] TUBE DESIGN FOR INTEGRAL RADIATOR/CONDENSER

[75] Inventor: Shrikant M. Joshi, Cambridge, Mass.

[73] Assignee: General Motors Corporation, Detroit, Mich.

[21] Appl. No.: 865,392

[22] Filed: Apr. 8, 1992

[51] Int. Cl.[5] .......................... F28F 13/00; F28D 7/16
[52] U.S. Cl. ................................ 165/135; 165/140; 165/176
[58] Field of Search ............... 165/140, 151, 152, 153, 165/173, 176, 135

[56] References Cited

U.S. PATENT DOCUMENTS

| | | | |
|---|---|---|---|
| 1,870,457 | 8/1932 | Kenney | 165/140 |
| 5,000,257 | 3/1991 | Shinmura | 165/140 |
| 5,009,262 | 4/1991 | Halstead et al. | 165/140 |
| 5,033,540 | 7/1991 | Tategami et al. | 165/135 |

FOREIGN PATENT DOCUMENTS

| | | | |
|---|---|---|---|
| 1994 | 1/1986 | Japan | 165/152 |
| 202084 | 9/1986 | Japan | 165/140 |
| 33288 | 2/1987 | Japan | 165/140 |

Primary Examiner—John Rivell
Assistant Examiner—L. R. Leo
Attorney, Agent, or Firm—Ronald L. Phillips

[57] ABSTRACT

A combination radiator and condenser apparatus has a pair of extruded tank and header assemblies adapted to be connected in both a coolant systsem for liquid cooled engine and a refrigerant system of an automobile air conditioning system. The assemblies each include an extruded tank with two compartments separated by an internal partition which extends the full height of the tank and each extruded tank further includes a slotted wall for receiving the ends of a plurality of unitary extruded fluid flow tubes extending between each extruded tank. Each of the unitary extruded fluid flow tubes have first and second passages therein connected respectively to the coolant chamber and the high pressure refrigerant chamber of each of the extruded tanks. The extruded tubes of the coolant passage and the refrigerant passage are separated by a connecting member for preventing the heat conduction from the coolant to the refrigerant. The connecting member may be a thin web or two web connection forming an air space.

2 Claims, 3 Drawing Sheets

TUBE DESIGN FOR INTEGRAL RADIATOR/CONDENSER

TECHNICAL FIELD

The invention relates to an apparatus in a motor vehicle having a liquid cooled engine and an air conditioning system, and more particularly to a combination radiator and condenser apparatus having parallel tube passes of the type having air centers for directing the inlet air stream of the vehicle through the separate tube passes in separate radiator and condenser portions of the combination radiator and condenser apparatus.

BACKGROUND OF THE INVENTION

Motor vehicle cooling systems for cooling engine coolant, refrigerant vapor and transmission oil are known in which either an oil cooler or refrigerant condenser unit are located upstream from the cooling air inlet side of the radiator for heat from the coolant system for a liquid cooled engine. Such refrigerant condensers and oil coolers have separate air centers and the radiator has separate air centers.

In order to meet space and weight design constraints and inlet air stream flow patterns in a motor vehicle, a combined radiator and condenser apparatus has been utilized as disclosed in U.S. Pat. No. 5,009,262, issued Apr. 23, 1991 in the name of Halstead et al, and assigned to the assignee of the subject invention. The combination apparatus provides thin gauge aluminum centers which are common for both the radiator and condenser, and each of the radiator and condenser units share a common tank member and common header plates. An extruded tank has an integral internal partition which separates the extruded tank into a coolant chamber and a high pressure refrigerant chamber. The tube passes of both the radiator and the condenser are bonded to an integral wall of the extruded tank at tube access slots therein. The tubes have the same air centers for defining a single air flow pass through both the radiator and the condenser.

One concern associated with this design is the conduction of heat from coolant to refrigerant. The water/glycol solution flowing in the radiator tubes has a temperature in the range of 100° F. higher than the freon flowing in the condenser tubes. This temperature difference will result in heat conduction from coolant to freon and will reduce the condenser performance significantly, which in turn will adversely affect the performance of the vehicle air conditioning system.

SUMMARY OF THE INVENTION

The invention includes a combination radiator and condenser apparatus for a motor vehicle having a plurality of parallel tube passes for cooling high pressure refrigerant vapor in an air conditioning system for the motor vehicle and for cooling engine coolant having air centers bonded thereto for cooling fluid flow through said parallel tube passes. The apparatus comprises the parallel tube passes each including a flow tube with aligned segments forming a refrigerant passage and a separate coolant passage. Also included are a pair of tank and header units. Each of the tanks and header units include a coolant space communicating with the coolant passages for flow of coolant therethrough. Each of the tank and header units also include a high pressure refrigerant space for communicating the refrigerant passages with a mechanical refrigerant system for directing refrigerant vapor through the refrigerant passages for condensation therein. A partition in each of the tank and header units extends the length thereof to separate the coolant space from the high pressure refrigerant space. Air center means are included and connected to each of the aligned flow tube segments for conductively transferring heat from the coolant and the refrigerant vapor. Also included is connecting means for integrally interconnecting the flow tubes forming the refrigerant passage and the flow tubes forming the coolant passage to reduce heat conduction therebetween. The connecting means establishes a thermal conduction path between the refrigerant passage and the coolant passage having a thickness less than the flow tube for reducing heat conduction therebetween.

The invention isolates the coolant from the freon to prevent the heat conduction across the web.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
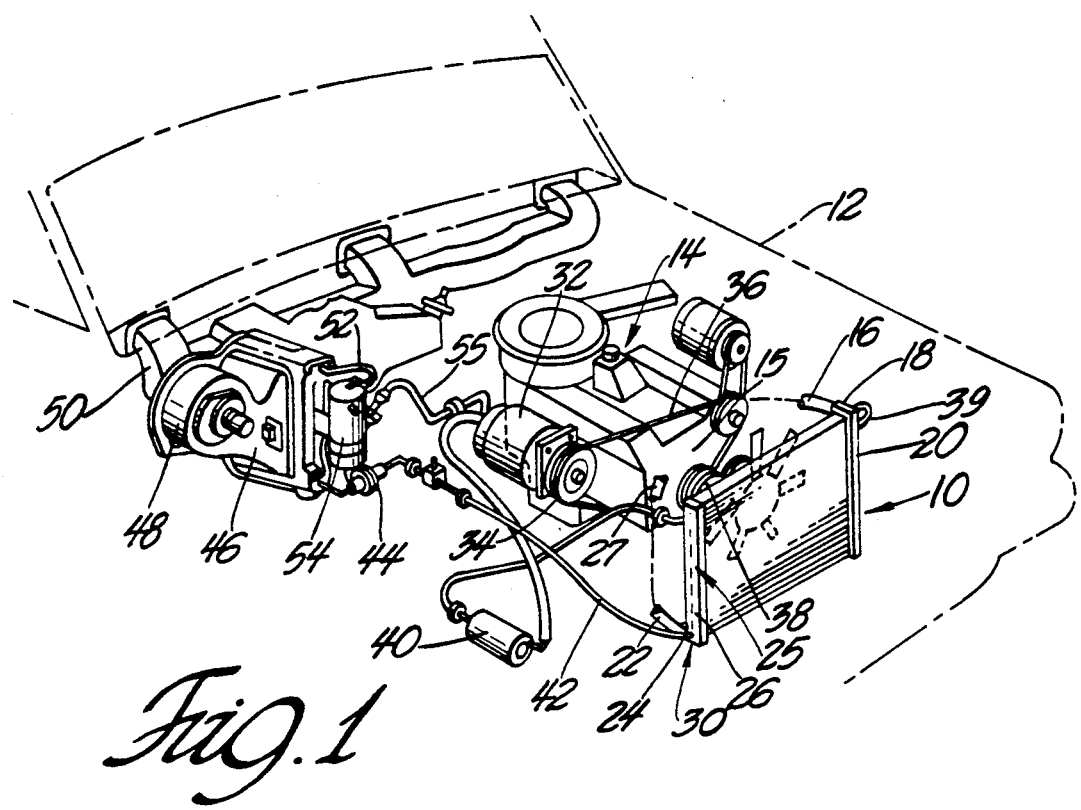
FIG. 1 is a perspective view of an automobile coolant system and air conditioning system including the combination radiator and condenser apparatus of the present invention.

Referring now to FIG. 1, a combination radiator and condenser apparatus 10 of the present invention is shown installed in the engine compartment of a motor vehicle 12 having a liquid cooled engine 14. A coolant pump 15 on the engine 14 directs liquid from the coolant passages of the engine for discharge through a radiator hose 16 which connects to an inlet fitting 18 on a radiator inlet tank 20 of the assembly 10. An outlet radiator hose 22 connects to an outlet fitting 24 on an outlet tank 26 and to the coolant jacket inlet 27. A radiator section 25 of the apparatus 10 is provided between the tanks 20 and 26. The radiator section 25 has a frontal flow area for unrestricted flow of the air intake stream.

The combination apparatus 10 includes a condenser section 30 which is connected to the discharge of a refrigerant compressor 32. The compressor 32 is driven through an electromagnetic clutch 34 by a belt 36 driven from an engine pulley 38 during engine operation. The compressor 32 discharges refrigerant at high pressure and in gaseous vapor form through a discharge line 39 containing a muffler 40 to the condenser section 30. The condenser section 30 has the same frontal flow area as that of the radiator section 25. The radiator section 25 and the condenser section 30 share the same air centers for preventing flow disturbances in the air intake stream of the vehicle across parallel tube passes and air centers therein to be described.

High pressure refrigerant vapor condenses in the condenser section 30 and the refrigerant exits the condenser section 30 at high pressure but in a liquid form through a high-pressure liquid line 42. The high pressure liquid line 42 is connected to a flow restrictor valve assembly 44 installed immediately upstream of an evaporator 46. Air is drawn through the evaporator on the air side thereof by an electric motor driven blower 48 and is blown at a reduced temperature into the passenger compartment through a mode control duct system 50.

Low pressure refrigerant vapor exits the evaporator 46 through a suction line 52 having an accumulator dehydrator unit 54 and is thence returned to the suction inlet of the compressor 32 via line 55. U.S. Pat. No. 5,009,262, issued Apr. 23, 1991 in the name of Halstead et al, also assigned to the assignee of the subject application, is incorporated by reference herein and provides the basic structure of the apparatus 10 from which the subject invention provides improvements as subsequently discussed.

Figure 2:
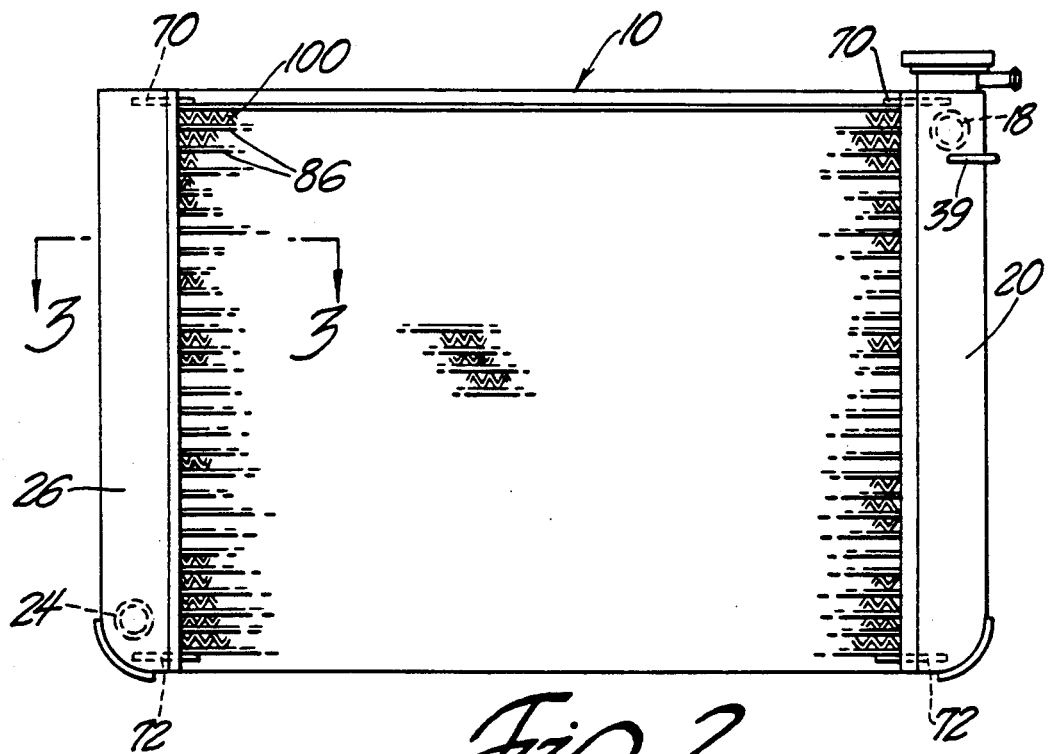
FIG. 2 is an enlarged front elevational view of the combination radiator and condenser apparatus of FIG. 1.
Figure 3:
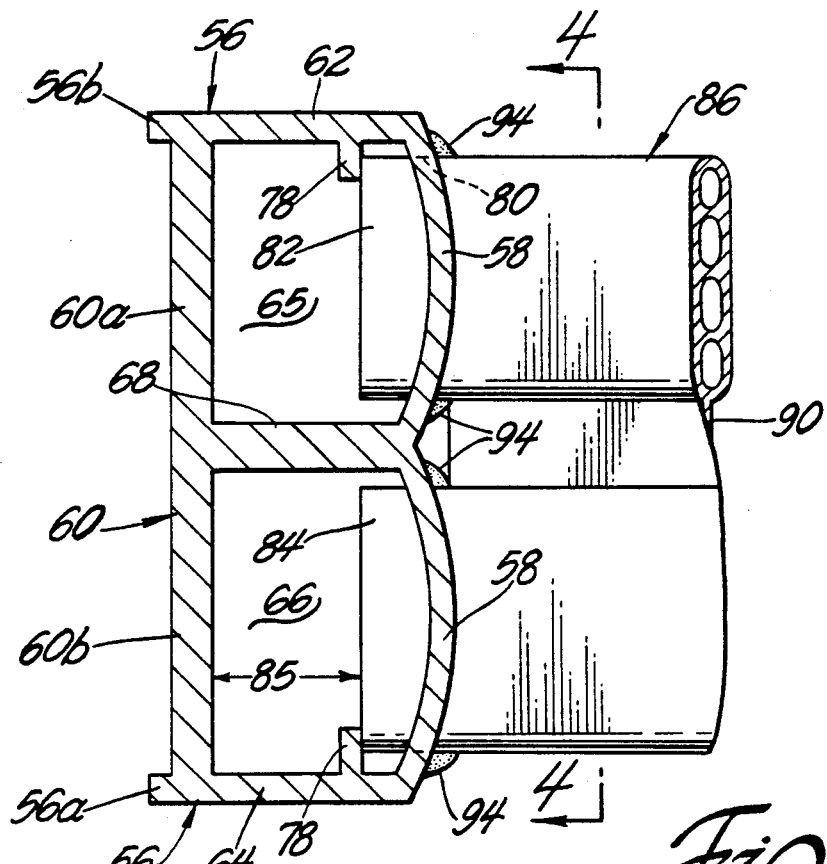
FIG. 3 is an enlarged fragmentary sectional view taken along lines 3—3 of FIG. 2 looking in the direction of the arrows showing a first embodiment of the invention.

Each of the inlet tank 20 and the outlet tank 26 is formed as an unitary extrusion 60 having a mounting rail 56 with side flanges 56a and 56b. The extrusion 60 also includes an integral header 58. The mounting rail 56 and the header 58 are common to both a radiator side 60a and a condenser side 60b of the extrusion 60. The mounting rail 56 and the header 58 extend in a compact space saving parallel relationship as seen in FIG. 3. The rail 56 and header 58 extend through the vertical height of the inlet and outlet tanks 20, 26 shown in FIG. 2. The extrusion 60 has spaced integral side walls 62, 64 integrally joined to the mounting rail 56 and the header 58 to form open ended coolant and high pressure refrigerant chambers or spaces 65, 66. An integral internal partition 68 divides the chambers 65, 66 and seals therebetween. End closures 70, 72 are directed through the header 58 at the top and bottom thereof to close the open ends of the chambers 65, 66.

The inlet fitting 18 and outlet fitting 24 are connected to the side walls 62 to communicate the coolant hoses 16, 22 with the coolant chambers 65 in the inlet tank 20 and the outlet tank 26. The compressor discharge line 39 is connected by a refrigerant fitting to the side wall 64 to communicate with the high pressure refrigerant chamber 66 in inlet tank 20 and the high pressure liquid line is connected by a refrigerant fitting to the side wall 64 to communicate with the refrigerant chamber 66 in the outlet tank 26.

The side walls 62, 64 have internal integral tube stops 78 therein and the headers 58 have a plurality of spaced slots 80 on either side of the divider partition 68 so as to be aligned with the tube stops 78. The slots 80 receive end extensions 82, 84 on either end of a common tube extrusion 86 forming a tube pass between the inlet tank 20 and the outlet tank 26. The end extensions 82, 84 engage the tube stops 78 to locate the end extensions 82, 84 in spaced relationship to the mounting rail 56 so as to define a gap therebetween for smooth flow of fluid from the ports of the tube extrusion 86 and the chambers 65, 66.

Figure 4:
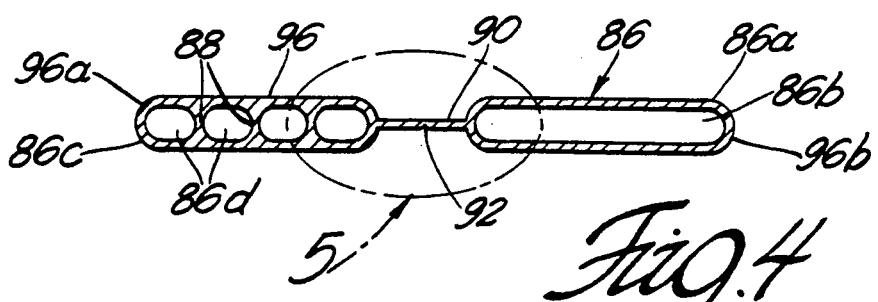
FIG. 4 is an enlarged fragmentary elevational view taken along lines 4—4 of FIG. 3 looking in the direction of the arrows.

As shown in FIG. 4, a common extruded tube 86 is shown having a coolant flow portion 86a with a single coolant passage 86b. The tube 86 has a refrigerant flow portion 86c with a plurality of separate refrigerant flow paths 86d separated by reinforcing webs 88 formed integrally of the tube 86. The tube 86 defines a vertical tube dimension or height in FIG. 4 across the flow path 86d or the height of the extruded tube 86. The resultant structure defines a tube of especially flat configured for use with a single air center and configured for reinforcing the high pressure refrigerant flow contained therein. The form of the tube extrusion 86 may include any of the types set forth in the referenced patent. The tube extrusions 86 have a curved air flow surface 96 including a leading edge 96a which is aligned with the inlet air stream of the motor vehicle. The extrusions 86 also have a trailing edge 96b for discharge of the inlet air stream into the engine compartment of the vehicle after both high pressure refrigerant and engine coolant are cooled by the operation subsequently described. The curved air flow surface 96 supports common air centers 100 for both the coolant flow and high pressure refrigerant flow.

Connecting means 90, 90' integrally connects the flow tubes 86c forming the refrigerant passages 86d to the flow tubes 86a forming the coolant passage 86b to reduce heat conduction therebetween. The connecting means 90, 90' establishes a thermal conduction path between the refrigerant passages 86d and the coolant passage 86b having a thickness less than the vertical dimension or height of the flow tube 86a, 86c for reducing heat conduction therebetween. The connecting means 90, 90' and therefore the conduction path are integral with the extruded tubes 86a, 86c and of same material. There are included two embodiments of the connecting means 90, 90', as subsequently discussed.

Figure 5:
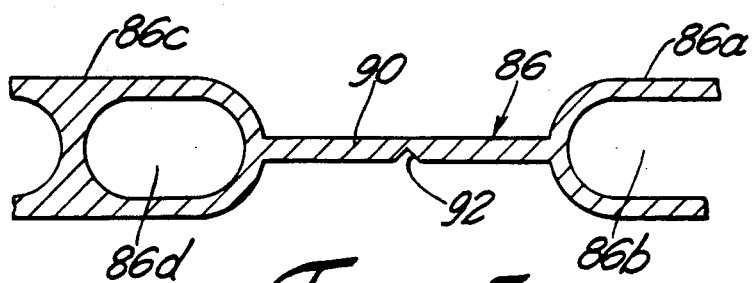
FIG. 5 is an enlarged fragmentary view of a portion indicated at line 5 in FIG. 4.

The connecting means 90 of the first embodiment is illustrated in FIGS. 3-5 and includes a web 90. The coolant flow portion 86a is spaced from the refrigerant flow portion 86c by a single joining web 90. The joining web 90 has a thickness of approximately the thickness of the wall of tube extrusion 86 and a length to span across the partition 68. The thickness of the web 90 is less than the vertical cross-sectional height of the flow paths or tubes 86a, 86c. The joining web 90 isolates the coolant and freon in the coolant flow tube 86a and refrigerant flow tube 86c for preventing heat conduction thereacross. The joining web 90 may also include a notch 92 in the center thereof to establish a minimal thickness less than the thickness of the web 90 and tube extrusion wall, as illustrated in FIGS. 4 and 5. The notch 92 further reduces the heat conduction from coolant to freon.

Figure 6:
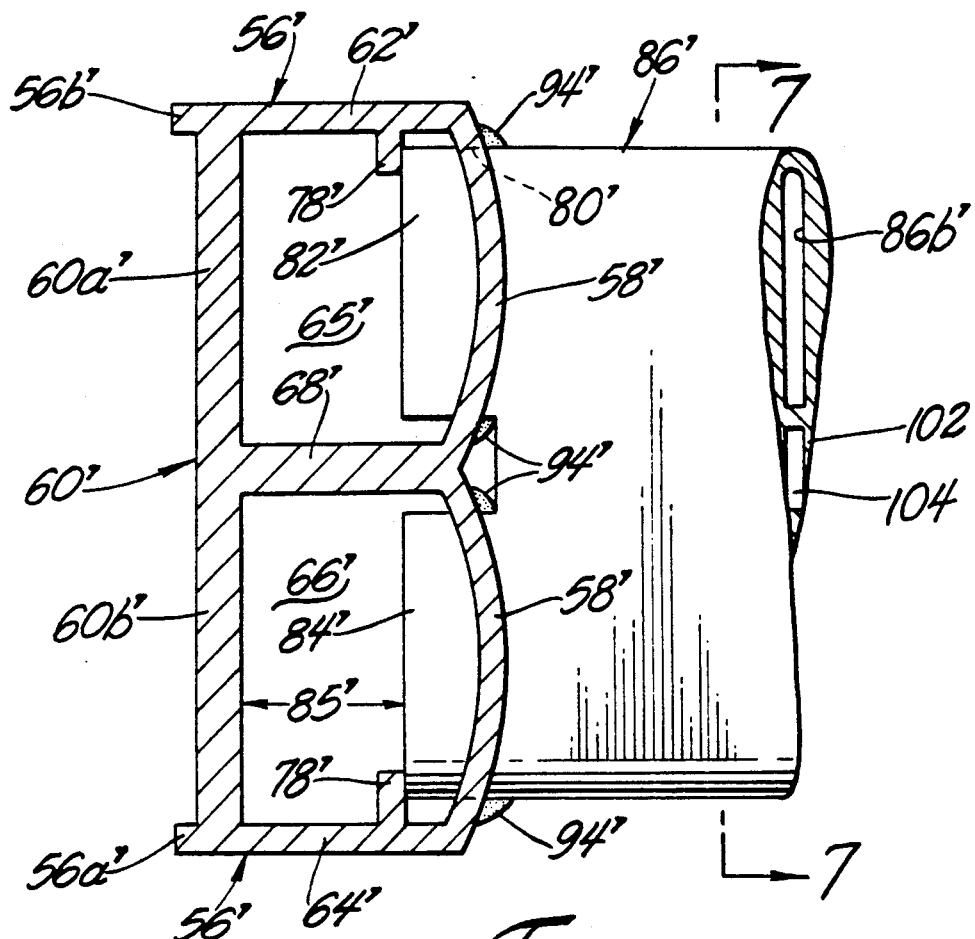
FIG. 6 is an enlarged fragmentary sectional view like FIG. 3 showing a second embodiment of the invention.
Figure 7:
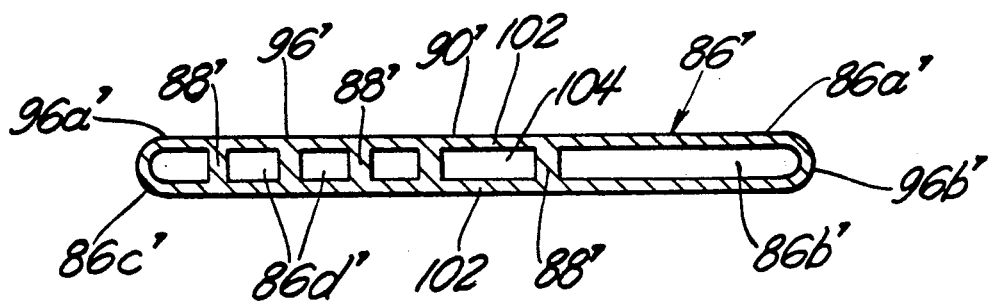
FIG. 7 is an enlarged fragmentary sectional view taken along lines 7—7 of FIG. 6 looking in the direction of the arrows.

In the second embodiment 90' illustrated in FIGS. 6-7, the connecting means comprises a pair of parallel tube webs 102. Like primed reference numbers in FIGS. 6-7 refer to like components of the first embodiment of FIGS. 3-5. A tube webs 102 interconnect the coolant flow portion 86a' and the refrigerant 86c' flow portion. The tube webs 102 form a blind port or air space aperture 104 extending therethrough for the length of the extruded tube 86' with air freely flowing therethrough at ends 105 to isolate the coolant and refrigerant reducing heat conduction therebetween. The thermal conductivity of air is approximately 7452 times less than that of aluminum. Therefore, the air pocket created by the blind port 104 will help reduce the heat conduction from coolant to refrigerant significantly. The blind port 104 extends approximately the width of the partition 68' and the length thereof with the tube webs 102 of equivalent thickness as the reinforcing webs 88' of the coolant 86a' and refrigerant 86c' flow portions.

Cladding material on the outer surface of the tube extrusions 86, 86' serves to form a brazed joints 94, 94' between the tube extensions 86, 86' and the header 58, 58' at the openings 80, 80' therein to prevent header leakage at the tube extrusions 86, 86'.

Operation of the embodiment of FIGS. 1-7 includes directing either fan induced or ram jet air as inlet air stream flow against the leading edges 96a, 96a' of the tubes 86, 86'. The inlet air stream is passed across the flow surface 96, 96' and through the common air centers 100 which are bonded to the surface 96, 96' for simultaneously removing heat by conductive heat transfer through the same air center element from both the radiator section 25 and the condenser section 30. In the case of the radiator section 25, heat is removed from the coolant being circulated through the flow paths 86b by flow of coolant from the radiator inlet hose 16, through the inlet fitting 18, to the coolant chamber 65, 65' and into the radiator section of the outlet tank 26. From the tank 26, the return coolant passes through the outlet fitting 24 and the return radiator hose 22 to the coolant jacket inlet 27. Simultaneously, if the air conditioning is turned on, the electromagnetic clutch 16 is energized by suitable control means of a conventional form well known in the art. The compressor 32 is thereby directly coupled to the engine output for compressing refrigerant vapor from the evaporator 46 and discharging the refrigerant vapor into the high pressure refrigerant vapor space 66, 66'. The refrigerant vapor is then passed through the tube pass 86, 86' at the flow paths 86d, 86d' therein where the vapor is cooled by direct conductive heat transfer to the common air centers 100 for extracting heat from the coolant in passages in flow paths 86d, 86d'. The web 90 and notch 92 or blind port 104 reduce heat conduction between the refrigerant flow portion 86c, 86c' and coolant flow portion 86a, 86a' of the extruded 86c' tube 86, 86'.

The conductive heat transfer for both coolant and refrigerant is from the tubes 86, 86' at the outer surface 96, 96'. The conductive heat transfer causes the high pressure refrigerant vapor to cool and condense into high pressure liquid which is collected and expanded across the expansion valve 44 for cooling the air flow across the evaporator 46.

Having described preferred embodiments of the combination condenser and radiator assembly of the present invention according to the present invention and in a particularly useful application thereof, it will be understood by those skilled in the art that the desired application and embodiments are obtained by a very compact arrangement of a few easily assembled parts which enable a combination assembly to be used either for air conditioning or non air conditioning applications. In such preferred constructions there is basically one common tube member which serves to flow both coolant and refrigerant at the same time if desired. But it will be understood by those skilled in the art that the above-described preferred embodiments are illustrative of the invention and may be modified within the scope of the appended claims.

What is claimed is:

1. A combination radiator and condenser apparatus for a motor vehicle having a plurality of parallel tube passes for cooling high pressure refrigerant vapor in an air conditioning system for the motor vehicle and for cooling engine coolant having air centers bonded thereto for cooling fluid flow through said parallel tube passes comprising:

said parallel tube passes each including a flow tube having a tube height with aligned segments forming a refrigerant passage and a separate coolant passage;

a pair of tank and header units;

each of said tanks and header units including a coolant space communicating with said coolant passages for flow of coolant therethrough, and a high pressure refrigerant space for communicating said refrigerant passages with a mechanical refrigerant system for directing refrigerant vapor through said refrigerant passages for condensation therein;

a partition in each of said tank and header units extending the length thereof to separate said coolant space from said high pressure refrigerant space;

air center means connected to each of said aligned flow tube segments for conductively transferring heat from said coolant and said refrigerant vapor; and a web of a predetermined thickness less than said tube height integrally interconnecting said parallel tube passes, said web further including a notch therein that establishes a minimal thickness less than said predetermined thickness, thereby reducing heat conduction between said parallel tube passes.

2. A combination radiator and condenser apparatus for a motor vehicle having a plurality of parallel tube passes for cooling high pressure refrigerant vapor in an air conditioning system for the motor vehicle and for cooling engine coolant having air centers bonded thereto for cooling fluid flow through said parallel tube passes comprising:

said parallel tube passes each including a flow tube having a tube height with aligned segments forming a refrigerant passage and a separate coolant passage;

a pair of tank and header units;

each of said tanks and header units including a coolant space communicating with said coolant passages for flow of coolant therethrough, and a high pressure refrigerant space for communicating said refrigerant passages with a mechanical refrigerant system for directing refrigerant vapor through said refrigerant passages for condensation therein;

a partition in each of said tank and header units extending the length thereof to separate said coolant space from said high pressure refrigerant space;

air center means connected to each of said aligned flow tube segments for conductively transferring heat from said coolant and said refrigerant vapor; and a pair of parallel webs of a predetermined thickness less than said tube height integrally interconnecting said parallel tube passes and forming a blind port extending between said parallel tube passes for reducing heat conduction therebetween.

* * * * *